(12) United States Patent
DeBruin et al.

(10) Patent No.: US 7,790,840 B2
(45) Date of Patent: Sep. 7, 2010

(54) CRYSTALLIZING CONVEYOR

(75) Inventors: Bruce Roger DeBruin, Lexington, SC (US); Richard Gill Bonner, Lexington, SC (US)

(73) Assignee: Eastman Chemical Company, Kingsport, TN (US)

( * ) Notice: Subject to any disclaimer, the term of this patent is extended or adjusted under 35 U.S.C. 154(b) by 952 days.

(21) Appl. No.: 11/440,142

(22) Filed: May 24, 2006

(65) Prior Publication Data

US 2007/0274789 A1 Nov. 29, 2007

(51) Int. Cl.
C08F 6/00 (2006.01)
(52) U.S. Cl. ...................... 528/480; 264/141
(58) Field of Classification Search .............. 406/197; 264/69, 142; 425/68, 311, 445; 528/480
See application file for complete search history.

(56) References Cited

U.S. PATENT DOCUMENTS

| | | | |
|---|---|---|---|
| 3,282,909 A | 11/1966 | Manuel et al. | |
| 3,544,525 A | 12/1970 | Balint et al. | |
| 3,969,324 A | 7/1976 | Berkau et al. | |
| 4,137,394 A | 1/1979 | Meihuizen | |
| 4,226,973 A | 10/1980 | Malo et al. | |
| 4,678,646 A | 7/1987 | Watanabe et al. | |
| 4,784,766 A | 11/1988 | Moritoki et al. | |
| 4,923,649 A | 5/1990 | Hsieh et al. | |
| 5,310,515 A | 5/1994 | Jurgen et al. | |
| 5,434,316 A | 7/1995 | Kissinger | |
| 5,633,018 A | 5/1997 | Stouffer et al. | |
| 5,714,571 A | 2/1998 | Al Ghatta et al. | |
| 6,255,435 B1 | 7/2001 | Hait et al. | |
| 6,479,625 B1 | 11/2002 | Moore | |
| 7,192,545 B2 * | 3/2007 | Ekart et al. ............ 264/211.13 | |
| 7,501,482 B2 | 3/2009 | DeBruin et al. | |
| 2002/0033131 A1 | 3/2002 | Bostrom et al. | |
| 2002/0171159 A1 | 11/2002 | Matthaei et al. | |
| 2004/0176565 A1 | 9/2004 | Lee et al. | |
| 2004/0242774 A1 | 12/2004 | Fujimura | |
| 2005/0004341 A1 | 1/2005 | Culbert et al. | |
| 2005/0059746 A1 | 3/2005 | Moncada Andres et al. | |
| 2005/0062186 A1 | 3/2005 | Fellinger | |

(Continued)

FOREIGN PATENT DOCUMENTS

CA 2340358 1/2001

(Continued)

OTHER PUBLICATIONS

The International Search Report from PCT application PCT/US/07/11794.

(Continued)

*Primary Examiner*—Douglas A Hess
(74) *Attorney, Agent, or Firm*—Jennifer R. Knight; Bernard J. Graves, Jr.

(57) ABSTRACT

A method of crystallizing a plurality of polymeric pellets includes a step of introducing the pellets into a pneumatic conveying system with an initial average temperature. The plurality of polymeric pellets are pneumatically transferred from the inlet to an outlet with a conveying gas. While residing within the conveying system, the pellets have a sufficient temperature for crystallization to occur. A pneumatic conveying system implementing the methods of the invention is also provided.

48 Claims, 7 Drawing Sheets

U.S. PATENT DOCUMENTS

| | | | |
|---|---|---|---|
| 2005/0065318 | A1 | 3/2005 | Jernigan |
| 2005/0085620 | A1 | 4/2005 | Bruckmann |
| 2005/0110182 | A1 | 5/2005 | Eloo |
| 2005/0110184 | A1 | 5/2005 | Eloo |
| 2005/0154183 | A1 | 7/2005 | Ekart |
| 2005/0272914 | A1 | 12/2005 | McElvain et al. |
| 2006/0047103 | A1 | 3/2006 | Armentrout et al. |
| 2007/0149756 | A1 | 6/2007 | Kulkarni |

FOREIGN PATENT DOCUMENTS

| | | |
|---|---|---|
| DE | 103 49 016.7 | 10/2003 |
| DE | 10 2004 015 515.1 | 3/2004 |
| DE | 10 2004 021 595.2 | 5/2004 |
| WO | 9818847 A1 | 5/1998 |
| WO | WO 2004/033174 A1 | 4/2004 |

OTHER PUBLICATIONS

Co-pending U.S. Appl. No. 11/440,192, filed May 24, 2006.
Co-pending U.S. Appl. No. 11/439,908, filed May 24, 2006.
Co-pending U.S. Appl. No. 11/439,777, filed May 24, 2006.
Office Action dated Apr. 10, 2008 in co-pending U.S. Appl. No. 11/440,192.
Office Action dated Aug. 1, 2008 in co-pending U.S. Appl. No. 11/440,192.
Office Action dated Jan. 5, 2009 in co-pending U.S. Appl. No. 11/440,192.
International Search Report from co-pending International application No. PCT/US07/11151.
Office Action dated Mar. 27, 2008 in co-pending U.S. Appl. No. 11/439,908.
Office Action dated Aug. 8, 2008 in co-pending U.S. Appl. No. 11/439,908.
Office Action dated Jan. 15, 2009 in co-pending U.S. Appl. No. 11/439,908.
International Search Report in co-pending International application No. PCT/US07/11803.
Office Action dated Mar. 27, 2008 in co-pending U.S. Appl. No. 11/439,777.
Office Action dated Jul. 21, 2008 in co-pending U.S. Appl. No. 11/439,777.
Notice of Allowance dated Nov. 3, 2008 in co-pending U.S. Appl. No. 11/439,777.
Extended European Search Report in corresponding application PCT/US2007011794.
Notice of Allowance dated Apr. 30, 2009 in co-pending U.S. Appl. No. 11/440,192.
H.D. Keith; Crystallization of Polymers from the Melt and the Structure of Bulk Semicrystalline Polymers; 1967; pp. 421-438; Bell Telephone Laboratories, Inc., Murray Hill, NJ.
Bae et al.; Crystallization-induced Sequential Reordering in Poly(trinnethylene terephthalate)/Polycarbonate Blends; Macromolecular Research; 2002; pp. 145-149; vol. 10, No. 3; Polymer Society of Korea.
Notice of Allowance dated Aug. 13, 2009 in co-pending U.S. Appl. No. 11/440,192.
Notice of Allowance dated Aug. 17, 2009 in co-pending U.S. Appl. No. 11/439,908.
Supplementary Notice of Allowance dated Sep. 23, 2009 in co-pending U.S. Appl. No. 11/439,908.
Co-pending U.S. Appl. No. 12/618,013, filed Nov. 13, 2009.
Office Action dated Dec. 17, 2009 in co-pending U.S. Appl. No. 12/618,013.

* cited by examiner

CRYSTALLIZING CONVEYOR

1. FIELD OF THE INVENTION

The present invention relates generally to methods and systems of crystallizing polymer pellets and more specifically to methods and systems of crystallizing polyester pellets.

2. BACKGROUND OF THE INVENTION

Thermoplastic resins are used in a multitude of commercial applications. Polyesters such as polyethylene terephthalate (PET), polyethylenenaphthalate (PEN), and similar polymers and copolymers, in particular, have become staple commodities whose manufacture is well known and mature. Applications of polyesters include food, beverage, and other liquid containers as well as synthetic fibers. Several polyesters such as PET may exist both in amorphous and semi-crystalline forms. Amorphous PET is transparent while crystalline PET is opaque.

In the conventional PET process, PET is formed by esterification of terephthalic acid and ethylene glycol in a reaction vessel to form a pre-polymeric mixture. The esterification need not be catalyzed. Typical ester exchange catalysts, which may be used separately or in combination, include titanium alkoxides, tin (II) or (IV) esters, zinc, manganese or magnesium acetates or benzoates, and/or other such catalyst materials that are well known to those skilled in the art. The pre-polymeric paste is subsequently heated to promote polymerization. The resulting mixture is then subjected to polycondensation in a melt at elevated temperatures, for example, 285° C., in the presence of a suitable catalyst. Compounds of Sn, Sb, Ge, Ti, or others have been used as polycondensation catalysts. The polymer is extruded directly from the polycondensation reactor into strands. The hot, extruded strands are contacted with cool water prior to chopping into pellets, dried, and stored into silos prior to crystallizing.

Pelletizing processes wherein strands are stretched prior to pelletizing are disclosed in U.S. Pat. No. 5,310,515. Conventional wisdom dictates that at least the surface of the pellets must be cooled to 20° C. to 30° C. to avoid sintering during storage. During storage, heat from the hotter interior of the pellets is distributed throughout the pellets. Thus, warm pellets, i.e., pellets whose exterior is significantly higher than 20° C. to 30° C. might agglomerate during storage following temperature equilibration. In addition to the decrease in temperature brought about by contact with water, the pellets can be further cooled to the desired temperature with cool air, nitrogen, or inert gas. The pellets are stored, and then subsequently reheated to the desired crystallization temperature. These steps of heating, cooling, and reheating result in a significant energy penalty in an already energy intensive process. The crystallization of the hot pellets is usually accomplished in a crystallizing shaker. Solid stating is used to both raise inherent viscosity and remove acetaldehyde.

With reference to FIGS. 1A, 1B, and 1C, diagrams of PET manufacturing facilities are provided. PET processing facility 10 includes mixing tank 12 in which terephthalic acid ("TPA") and ethylene glycol ("EG") are mixed to form a pre-polymeric paste. This pre-polymeric paste is transferred and heated in esterification reactor 14 to form an esterified monomer. The pressure within esterification reactor 14 is adjusted to control the boiling point of the ethylene glycol and help move the products to esterification reactor 16. The monomer from esterification reactor 14 is subjected to additional heating in esterification reactor 16 but this time under less pressure than in esterification reactor 14. Next, the monomers from esterification reactor 16 are introduced into pre-polymer reactor 18. The monomers are heated while within pre-polymer reactor 18 under a vacuum to form a pre-polymer. The inherent viscosity of the pre-polymer begins to increase within pre-polymer reactor 18. The pre-polymer formed in pre-polymer reactor 18 is sequentially introduced into polycondensation reactor 20 and then polycondensation reactor 22. The pre-polymer is heated in each of polycondensation reactors 20, 22 under a larger vacuum than in pre-polymer reactor 18 so that the polymer chain length and the inherent viscosity are increased. After the final polycondensation reactor, the PET polymer is moved under pressure by pump 24 through filters 26, 28 and through dies 30, 32, 34, forming PET strands 36, 38, 40 (see FIG. 1B).

With reference to FIG. 1B, a method for forming polyester pellets is illustrated. Extruded polymer strands 36, 38, 40 are cooled by water spray streams 42, 44, 46 onto the strands as the strands emerge from dies 30, 32, 34. After emerging from dies 30, 32, 34, strands 36, 38, 40 are cut by cutters 54, 56, 58 into pellets 48, 50, 52 while the strands are still hot. Polyester pellets formed in this manner tend to have a cylindrical shape, but can be modified to cubic, dog bone, or other shapes. At this point in the process, polyester pellets are usually amorphous. The polyester pellets are typically crystallized before being shipped to a customer. Such crystallization allows subsequent drying at higher temperatures so that the polyester may be extruded as desired. Crystallization of the polyester pellets is typically achieved by reheating the pellets to a temperature above the crystallization temperature. As the pellets crystallize, additional heat is derived due to the generated heat of crystallization. This additional heat tends to make the pellets soft and adherent to each other. Therefore, the pellets are agitated to avoid them sticking together due to softening. After crystallization, the pellets are generally solid stated to raise inherent viscosity with inert gas passing around the hot pellets.

With reference to FIG. 1C, a schematic of an alternative pellet forming process is provided. In this variation, strands 60, 62, 64 emerging from die dies 66, 68, 70 are cut into pellets 72, 74, 76 under water by die face cutters 80, 82, 84. In this variation, the extruded polyester strands are completely immersed and cut underwater upon exiting dies 66, 68, 70. Pellets 72, 74, 76 formed in this manner tend to have a spherical shape because of the surface tension of the molten polyester when emerged in water. Initially, after cutting, pellets 72, 74, 76 still retain a substantial amount of heat in the interior. Subsequently, the pellet/water combination is sent to dryer 90 via conveying system 92. Examples of useful dryers include centripetal dryers that remove pellets 72, 74, 76 from the water. Upon exiting dryer 90, additional water is boiled off due to the heat content of pellets 72, 74, 76, which is still high upon emerging from dryer 90. If the pellet/water combination is transported to the dryer sufficiently fast the polyester pellets may retain sufficient heat for crystallization to occur. Pellets 72, 74, 76 are then transferred to crystallizer 94 where they reside for a residence time (about 2 to 20 minutes) for crystallization to occur. Crystallizer 94 also provides sufficient agitation to inhibit the polyester pellets from sticking together.

International Patent Appl. No. WO2004/033174 and U.S. Pat. Appl. Nos. 20050110182 and 20050110184 disclose methods for crystallizing polymeric pellets. International Patent Appl. No. WO2004/033174 discloses a method in which polymeric pellets are treated in a liquid bath (e.g., water bath) at an elevated temperature to induce crystallization. U.S. Pat. Appl. Nos. 20050110182 and 20050110184 disclose method in which air is injected into the pellet/water slurry of FIG. 1C in order to transport the pellets quickly to and through dryer 90.

After crystallization, pellets 72, 74, 76 are transported by dense phase convey system 96 to one or more pellet processing stations. Such dense phase convey systems utilize air to move the pellets from one location to another. For example, the pellets are transported to a blending silo in which the average properties of the pellets might be adjusted. In such blending silos, polyester pellets are mixed together to achieve a target specification. Such specification may be with respect to color, molecular weight, catalyst concentration, additive concentration, density, and the like. In still another example, the pellets are conveyed to a solid stating process reactor. It should be noted, that dense phase convey systems tend to be more useful than dilute phase convey systems in this application since dilute phase convey systems can result in the surface of the pellets being melted or have high impact velocities thereby forming undesirable streamers and fines.

Although these methods and systems for making polymeric pellets and, in particular, polyester pellets work well, the equipment tends to be expensive to fabricate and to maintain. A typical PET manufacturing line may include several crystallizers each of which utilizes a rather large motor and occupies a larger footprint in the manufacturing plant. The initial capital investment of such crystallizer may easily exceed a million dollars.

Accordingly, there exists a need for polymer processing equipment and methodology that is less expensive to install, operate, and maintain.

3. SUMMARY OF THE INVENTION

The present invention overcomes one or more problems by providing in at least one embodiment a method of crystallizing a plurality of polymeric pellets. The method of the present embodiment includes a step in which a plurality of polymeric pellets are introduced into a pneumatic conveying system at an inlet. For crystallization to be possible, the polymeric pellets must be formed from one or more polymers that are crystallizable. Such crystallizable polymers are characterized by a crystallization temperature and a melting temperature. Moreover, the plurality of polymeric pellets is characterized with an average pellet temperature. The plurality of polymeric pellets are introduced into the pneumatic conveying system with an initial average temperature. The plurality of polymeric pellets are pneumatically transferred from the inlet to an outlet with a conveying gas. The conveying gas has a temperature sufficient to maintain the plurality of pellets within a temperature range such that crystallization of the plurality of polymeric pellets is substantially initiated or accomplished prior to removal of the pellets from the outlet of the pneumatic conveying system.

The present invention advantageously promotes crystallization of polymer pellets as they are being pneumatically conveyed away from a dryer. In order to complete crystallization, pellets require sufficient residence time in the pneumatic conveying system. Since crystallization rates increase with temperature, the time period required for crystallization can be reduced by crystallizing at higher temperatures. For example, crystallization can be achieved in two minutes at a temperature of 190° C. The present embodiment adjusts the crystallization temperature in the pneumatic conveying system by adjusting the temperature of the conveying gag used to transport the pellets. In at least one embodiment, the conveying gas is air. Advantageously, the present invention can eliminate the use of a crystallization shaker deck thereby resulting into substantial cost savings.

In one variation of the present embodiment, the crystallizing conveyor system carries the pellets directly from the cutter to the stripper, thereby eliminating the need for a crystallizer/shaker. In another variation, the crystallizing conveyor includes at least one upwardly inclined section to facilitate mixing of the pellets during crystallization/stripping. A liquid with a boiling point within the temperature range of the system or another gas can be added to the conveyor system to facilitate cooling within the system.

In variations of the present embodiment, all or part of the acetaldehyde is stripped from the plurality of polymeric pellets while the pellets are resident in the pneumatic conveying system. When stripping is optimally carried out, both the crystallizer/shaker and the a separate vessel for stripping can be eliminated. Therefore, the hot conveying gas employed in the crystallizing conveyor can function as a fluid for transporting the pellets, a source of heat for accelerating crystallization, and a stripping gas for removing acetaldehyde. The conveying gas/pellet ratio and temperature in the crystallizing conveyor can be adjusted to fine tune residence time and/or degree of stripping. A usable temperature for removing acetaldehyde from polymeric pellets and in particular PET pellets is from 150° C. to 200° C.

In another embodiment of the present invention, a pneumatic conveying system for crystallizing polymeric pellets is provided. The pneumatic conveying system includes a conduit for pneumatically transporting a plurality of polymeric pellets with a conveying gas. The conduit is of sufficient length such that, when the temperature of the conveying gas is within a predetermined range, crystallization of the plurality of polymeric pellets is substantially initiated or accomplished prior to removal of the pellets from the pneumatic conveying system. The pneumatic conveying system further includes an inlet for introducing the plurality of polymeric pellets into the conduit and an outlet for removing the plurality of polymeric pellets.

Additional advantages and embodiments of the invention will be obvious from the description, or may be learned by practice of the invention. Further advantages of the invention will also be realized and attained by means of the elements and combinations particularly pointed out in the appended claims. Thus, it is to be understood that both the foregoing general description and the following detailed description are exemplary and explanatory of certain embodiments of the invention and are not restrictive of the invention as claimed.

4. BRIEF DESCRIPTION OF THE DRAWINGS

5. DETAILED DESCRIPTION OF THE INVENTION

Figure 1A:
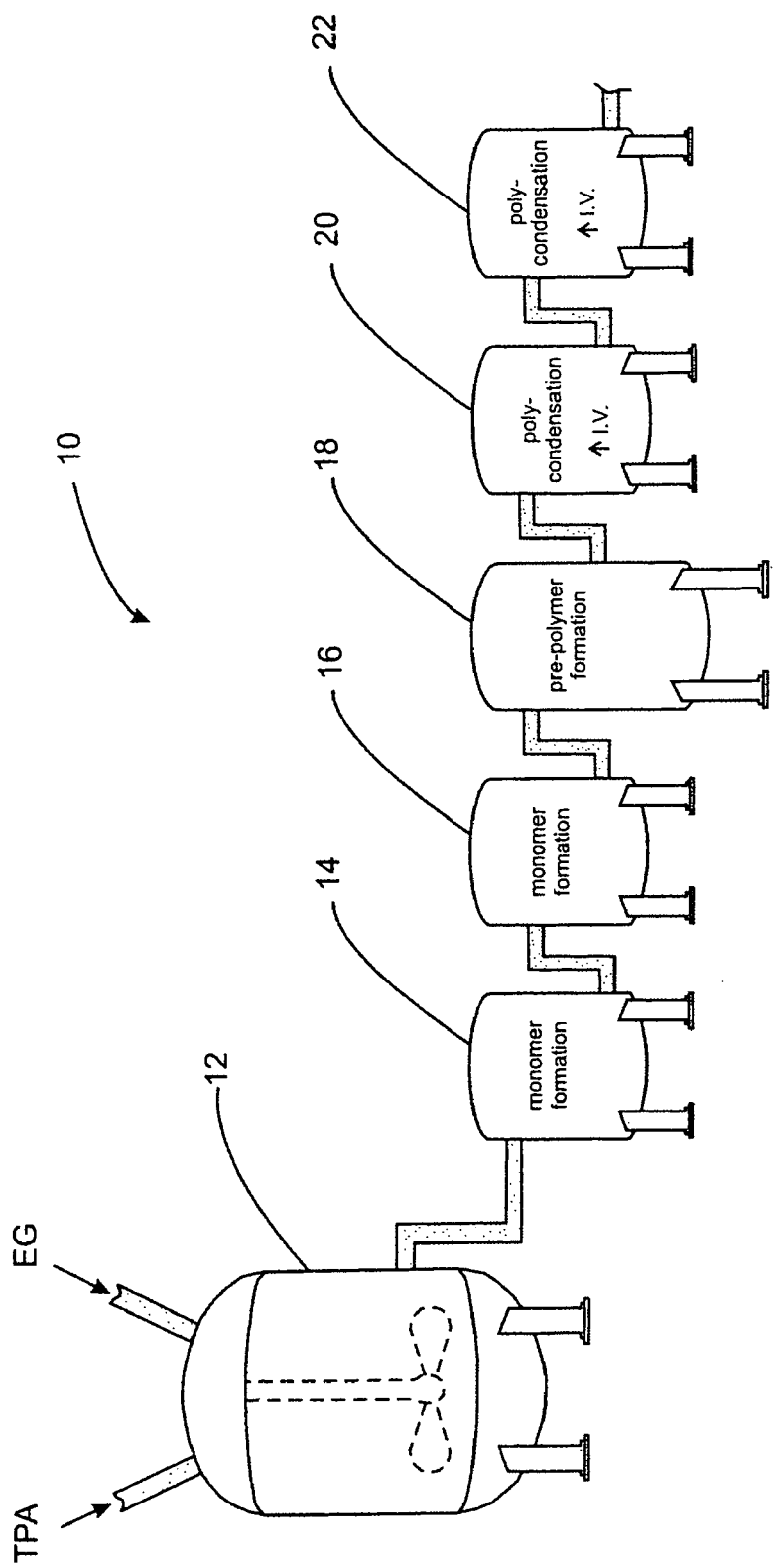
FIG. 1A is a schematic illustration of a polyester manufacturing line through the polycondensation reactors.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of courses vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "polymeric pellet" as used herein means a three dimensional object formed from a polymer. Such polymeric objects include a largest dimension that is greater than or equal to the extent of the polymeric object in any direction. Polymeric pellets occur in a number of shapes such as spherical, cylindrical, and the like. The largest dimension of a sphere is the diameter.

The term "heat of crystallization" as used herein means the quantity of heat released as a unit of mass of a substance crystallizes.

The term "crystallization temperature" as used herein means the temperature at which at least part of a material begins to crystallize.

The term "melting temperature" as used herein means the temperature at which at least part of a material is transformed from a crystalline state to a liquid. When a material undergoes such a transformation over a temperature range, for purposes of the present invention, the melting temperature is the median temperature of such a range. Typically, amorphous pellets melt at a lower temperature than crystalline pellets.

The term "degree of crystallinity" as used herein means the fractional amount of crystallinity in a polymeric sample. In the present invention, the degree of crystallinity is the average fractional amount of crystallinity in the polymeric pellets. Degree of crystallinity can be expressed as either a weight percent or a volume percent. As used herein, the degree of crystallinity is expressed as a weight percent unless expressly stated to be otherwise.

In an embodiment of the present invention, a method of crystallizing a plurality of polymeric pellets is provided. The plurality of polymeric pellets in accordance with the present invention are introduced into a pneumatic conveying system. In general, the plurality of pellets to be crystallized in accordance with the present invention are amorphous pellets or pellets with less than a desired degree of crystallinity. In a variation of the present embodiment, the degree of crystallinity of the pellets prior to crystallization is less than 30 wt. %. In another variation of the present embodiment, the degree of crystallinity of the pellets prior to crystallization is less than 20 wt. %. In still another variation of the present embodiment, the degree of crystallinity of the pellets prior to crystallization is less than 10 wt. %.

After crystallization, the degree of crystallinity is typically greater than 30 wt. %. In other variations, after crystallization, the degree of crystallization is greater than 40 wt. %. For most applications, the degree of crystallinity after crystallization is less than 70 wt. %. In other variations, the degree of crystallinity after crystallization is less than 60 wt. %. In still other variations, the degree of crystallinity after crystallization is less than 50 wt. %.

Advantageously, the polymeric pellets that are to be crystallized include any crystallizable polymer. The crystallizable polymers are characterized by a crystallization temperature and a melting temperature. Examples of such polymers include, but are not limited to, polyesters, polyolefins, polystyrenes, nylons, and polyketones. Polymers that have a relatively high heat of crystallization are most useful. In a variation, the heat of crystallization of such useful polymers is such that the heat of crystallization divided by the heat capacity of the polymer is at least 5° C. The present embodiment is particularly useful for crystallizing polyalkylene terephthalate polymers, especially polyethylene terephthalate polymers.

In a variation of the present invention, virgin polyester molten polymer is melt phase polymerized in a continuous process with the resulting molten polymer solidified to form pellets in contact with a liquid such as water. At least a portion of the liquid is separated from the pellets. The pellets are then introduced into the convey system of the invention. In a further refinement, the liquid is continuously separated from the pellets to form a stream of partially dried pellets. Subsequently, this stream of pellets is continuously introduced into the inlet of the conveying system of the invention. In some variations, the pellets have a moisture content less than 1 wt % when introduced into the inlet of the conveying system. In other variations, the pellets have a moisture content less than 0.2 wt % when introduced into the inlet of the conveying system. For example, polyalkylene terephthalate polymers exiting the melt phase polymerization process, or as introduced into the conveying system of the invention, have an It.V. of at least 0.50 dL/g, or at least 0.55 dL/g, or at least 0.6 dL/g, and especially at least 0.70 dL/g, or at least 0.72 dL/g, or at least 0.74 dL/g, or at least 0.76 dL/g, or at least 0.78 dL/g, and up to about 1.2 dL/g, or 1.1 dL/g, or 0.9 dL/g. The partially crystallized polyester polymers are also advantageously not solid state polymerized. Thus, there is also provided an embodiment encompassing a shipping container containing a plurality of partially crystallized pellets with a degree of crystallinity of at least 20% and an It.V. of at least 0.70 dL/g which have not been solid state polymerized. Suitable shipping containers are those suitable for shipping in commerce, having a volume of at least 1 cubic meter or more, or 2 cubic meters or more, or 3 cubic meters or more, or 8 cubic meters or more, or 20 cubic meters or more, and include Gaylord boxes, rail tank cars, trailers for tractor trailers, and ship hulls. The It.V. of the pellets may any value identified above higher than 0.70 dL/g, and the degree of crystallinity may be any value higher than 20% as identified above.

Figure 1B:
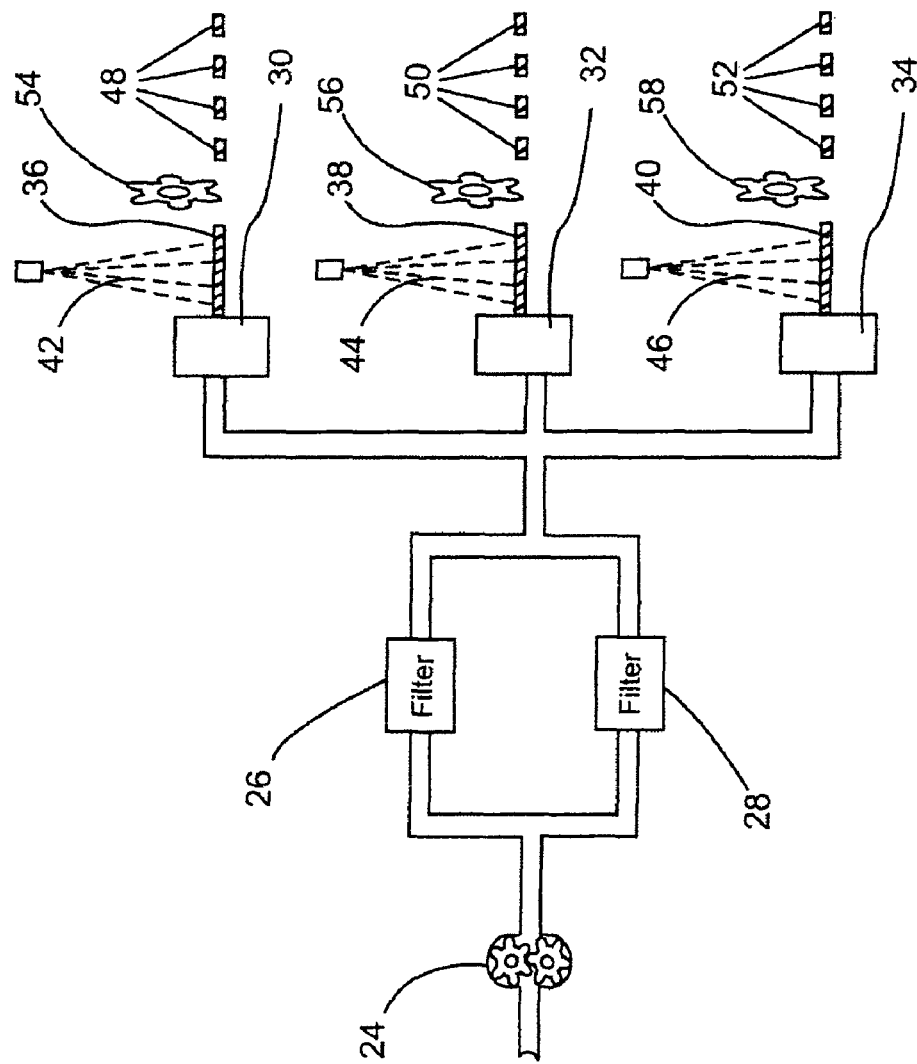
FIG. 1B is a schematic illustration of a polyester manufacturing line showing processing after polycondensation reactors using strand cutters to form the polyester pellets.

The pellets utilized in the methods of the invention are formed from a variety of methods known to those skilled in the art. Examples of such pellet forming processes include, but are not limited to, the processes depicted in FIGS. 1A, 1B, and 1C and described above. It should be recognized that the present invention provides, in at least one embodiment, an improvement over systems using crystallizers such as the one described in connection with the description of FIG. 1C. In particular, the present invention allows for the elimination of crystallizers along with a concurrent significant decrease in equipment cost.

The methods of the present embodiment are used to crystallize pellets of virtually any shape or size. Typically, at least a portion of the plurality of polymeric pellets are three dimensional objects characterized by a largest size dimension that is less than 0.25 inches. Examples of pellets shapes that are usable in the practice of the present invention include, but are not limited to, spherically shaped pellets, cylindrically shaped pellets, and pellets with a rectangular cross section.

Figure 2:
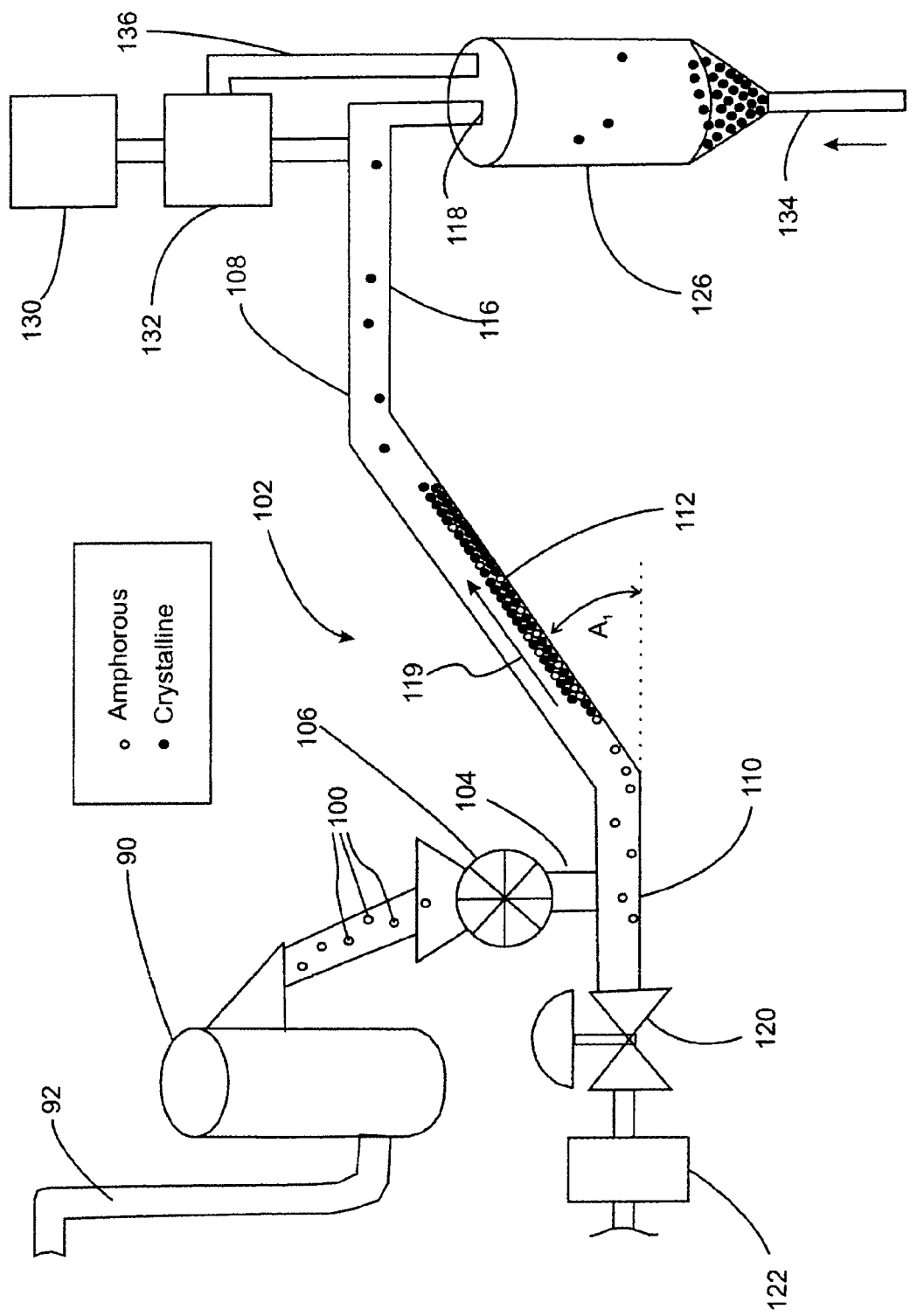
FIG. 2 is a schematic illustration of an embodiment of a pneumatic conveying system usable in the methods of the invention.

With reference to FIG. 2, an idealized schematic illustration of an embodiment of the present invention is provided. The method of this embodiment comprises introducing a plurality of polymeric pellets 100 into pneumatic conveying system 102 via pellet inlet 104. In a variation, plurality of pellets 100 are introduced into the crystallizer in an amount of 5,000 lb/hr to 200,000 lb/hr. In a variation, recycled pellets may be introducing into pneumatic conveying system 102 along with polymeric pellets 100 via differential pressure separation device 106. In this variation, the temperature of pellets 100 may be adjusted by varying the temperature of the recycled pellets.

In at least the illustrated embodiment, the pellets 100 are introduced into pellet inlet 104 by differential pressure separation device 106. Examples of devices that may be used for differential pressure separation device 106 include, but are not limited to, rotary airlocks and blow pots.

The plurality of polymeric pellets 100 has an initial average pellet temperature when introduced into conveying system 102. In some variations of the present embodiment, pellets 100 are at an elevated temperature that is useful for crystallization to occur while pellets 100 are resident in conveying system 102. In at least some embodiments, such as when the pellets 100 are PET, the elevated temperature is from 135° C. to 205° C., and in other embodiments from 155° C. to 200° C. The polymeric pellets may be provided in any manner including processes in which the polymeric pellets are reheated after cooling. An example of such a process includes PET strands cut by a strand cutter as set forth above in connection with the description of FIG. 1B.

Pneumatic conveying system 102 includes conveying conduit 108. In a refinement of the present embodiment, the total length of conveying conduit 108 is from 10 feet to 1000 feet. In another refinement, the total length of conveying conduit 108 is from 50 feet to 500 feet. In yet another refinement, the total length of conveying conduit 108 is from 100 feet to 300 feet.

Conveying conduit 108 includes conduit section 110 that is substantially horizontal. The horizontal configuration of conduit section 110 allows the pellets to become situated for conveyance. Typically, conduit section 110 is from 5 to 20 pipe diameters (i.e., the diameter of conduit section) in length. Pneumatic conveying conduit 110 optionally includes upwardly inclined section 112. Upon entering upwardly inclined section 112, the pellets 100 are directed to move in an upward direction as defined by angle $A_1$ against the force of gravity. Angle $A_1$ is typically less than 90° and more than 0°. In a variation, $A_1$ is from 25° to 65°. In another variation, $A_1$ is from 35° to 55°. Optimally, $A_1$ is about 45°. Conveying conduit 108 optionally includes additional conduit sections such as conduit section 116 that is also substantially horizontal and one or more vertical sections (not shown).

In accordance with the method of the present embodiment, the plurality of polymeric pellets is pneumatically transferred from the inlet 104 to outlet 118 by a conveying gas, schematically illustrated at 119. The flow of conveying gas 119 may be adjusted by flow control device 120. Examples of suitable flow control device 120 include, but are not limited to, metering compressors, flow meters, mass flow controller, valves, orifices, diverging nozzles, and the like. The conveying gas 119 has a temperature sufficient to maintain the plurality of pellets 100 within a temperature range such that crystallization of the plurality of polymeric pellets 100 is substantially initiated or accomplished prior to removal of the pellets from pneumatic conveying system 102. In at least one embodiment, the temperature range is below the melting temperature of polymeric pellets 100. For example, when pellets 100 are formed from PET, this temperature range is from 135° C. to 200° C.

The conveying gas 119, which is effecting the transfer of the pellets, may optionally be heated or cooled by temperature adjustment device 122. Moreover, the conveying gas temperature as introduced into the conveying system can be greater than or less than the temperature of the pellets introduced into said inlet. In other variations, one or more portions of conveying conduit 108 may be heated or cooled by heat jackets utilizing water, steam, or other heat transfer media. FIG. 2 illustrates the pellets 100 being transferred to collection device 126. Finally, the conveying gas 119 is optionally recovered via heat exchange device 130 and volatile organic compounds may be destroyed in thermal destruction device 132. Optionally, a particulate removal device (not shown) may be positioned before or after heat exchange device 130. In other variations, the temperature of the conveying gas 119 can be adjusted by adding hot or cold gas along the length of conveying conduit 108. Typically, the conveying gas is introduced into the conveying system at a temperature ranging from 0 to 220° C.

Conveying system 102 can be either a dense phase or dilute phase convey system. When convey system 102 is a dense phase convey system, in at least one embodiment, the length of conveying conduit 108 is from 5 to 20 pipe diameters in length with a residence time from 30 seconds to 20 minutes. In other variations, the residence time is from 1 minute to 20 minutes. In yet other variations, the residence time is from 1 minute to 10 minutes. In a variation when conveying system 102 is a dense phase convey system, the conveying velocity is in the range from 100 to 1000 feet per minute with a conveying pressure less than or equal to 100 PSIG. In another variation when conveying system 102 is a dense phase convey system, the conveying velocity is in the range from 1000 to 3000 feet per minute with a conveying pressure less than or equal to 100 PSIG. In yet another variation when conveying system 102 is a dense phase convey system, the conveying velocity is from 50 to 1000 feet per minute with a conveying pressure less than or equal to 15 inches of mercury. When convey system 102 is a dilute phase convey system, in at least one embodiment, the length of conveying conduit 108 is from 5 to 20 pipe diameters in length with a residence time from 30 seconds to 10 minutes. In a variation when conveying system 102 is a dilute phase convey system, the conveying velocity is from 1000 to 4000 feet per minute with a conveying pressure less than or equal to 15 PSIG. In another variation when conveying system 102 is a dilute phase convey system, the conveying velocity is greater than or equal to about 4000 feet per minute with a conveying pressure less than or equal to 15 PSIG. In yet another variation when conveying system 102 is a dilute phase convey system, the conveying velocity is from 1000 to 4000 feet per minute with a conveying pressure less than or equal to 15 inches of mercury. In still variation when conveying system 102 is a dilute phase convey system, the conveying velocity is greater than or equal to 4000 feet per minute with a conveying pressure less than or equal to 15 inches of mercury.

In another variation of the present invention, pellets 10 are contacted with a fluid at a temperature such that the pellets are cooled while being transported in pneumatic conveying system 102. In a further refinement of this variation, the fluid is a liquid with a boiling point lower the average temperature of pellets 100 at the location where contact with the fluid is made. Therefore, in this refinement the fluid boils upon contact with the pellets.

Figure 3:
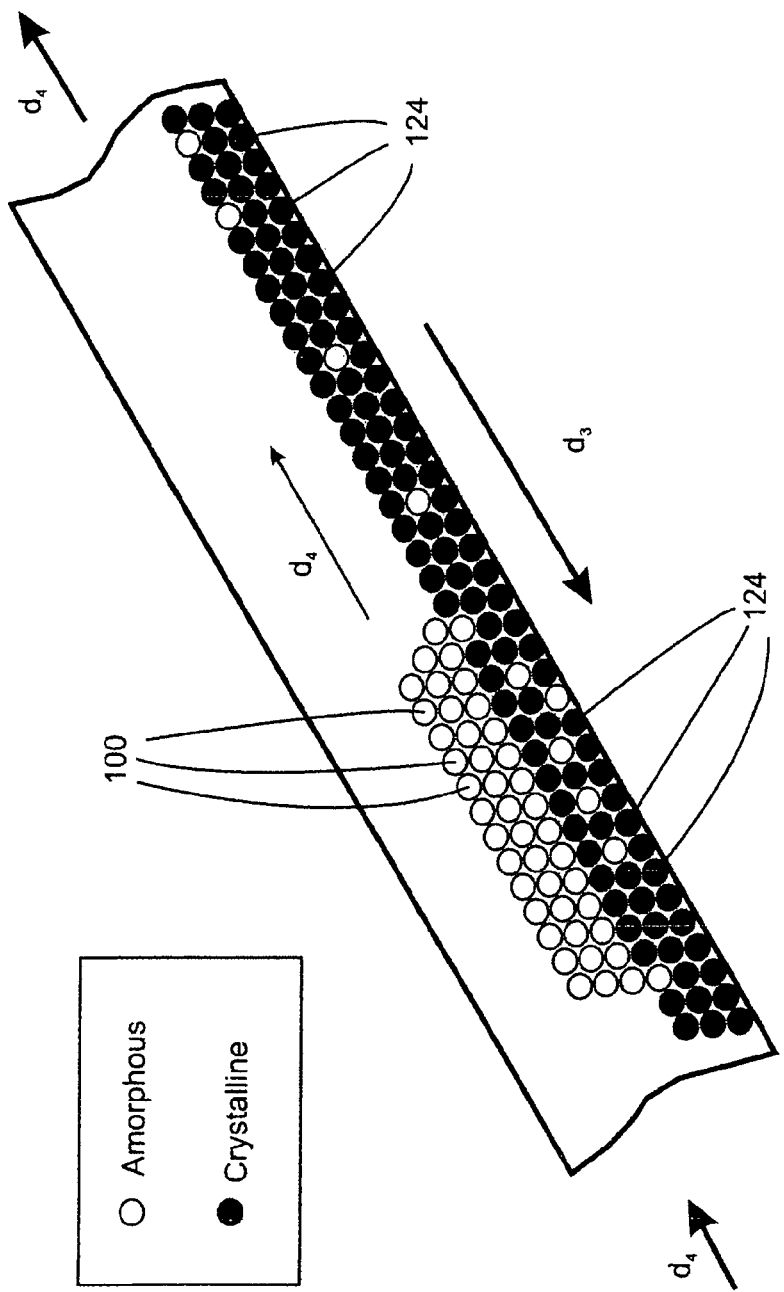
FIG. 3 is a schematic illustration of mixing of pellets in an inclined conduit section.

With reference to FIG. 3, a schematic illustration of upwardly inclined section 112 with pellets 100 contained therein is provided. When pneumatic conveying system 102 includes upwardly inclined section 112, there is a tendency for some of the pellets 100 to move downhill under the force of gravity as indicated by direction $d_3$. Since overall, there is a net movement of pellets uphill in direction $d_4$, this tendency advantageously allows for mixing of the pellets. Therefore, pellets 124, which have crystallized and tend to be hotter because of the generated heat from the heat of crystallization are efficiently mixed with the amorphous pellets 100 that have not yet crystallized. This allows the transfer of heat from crystallized pellets 124 to amorphous pellets 100, which assists the amorphous pellets to crystallize.

Figure 1C:
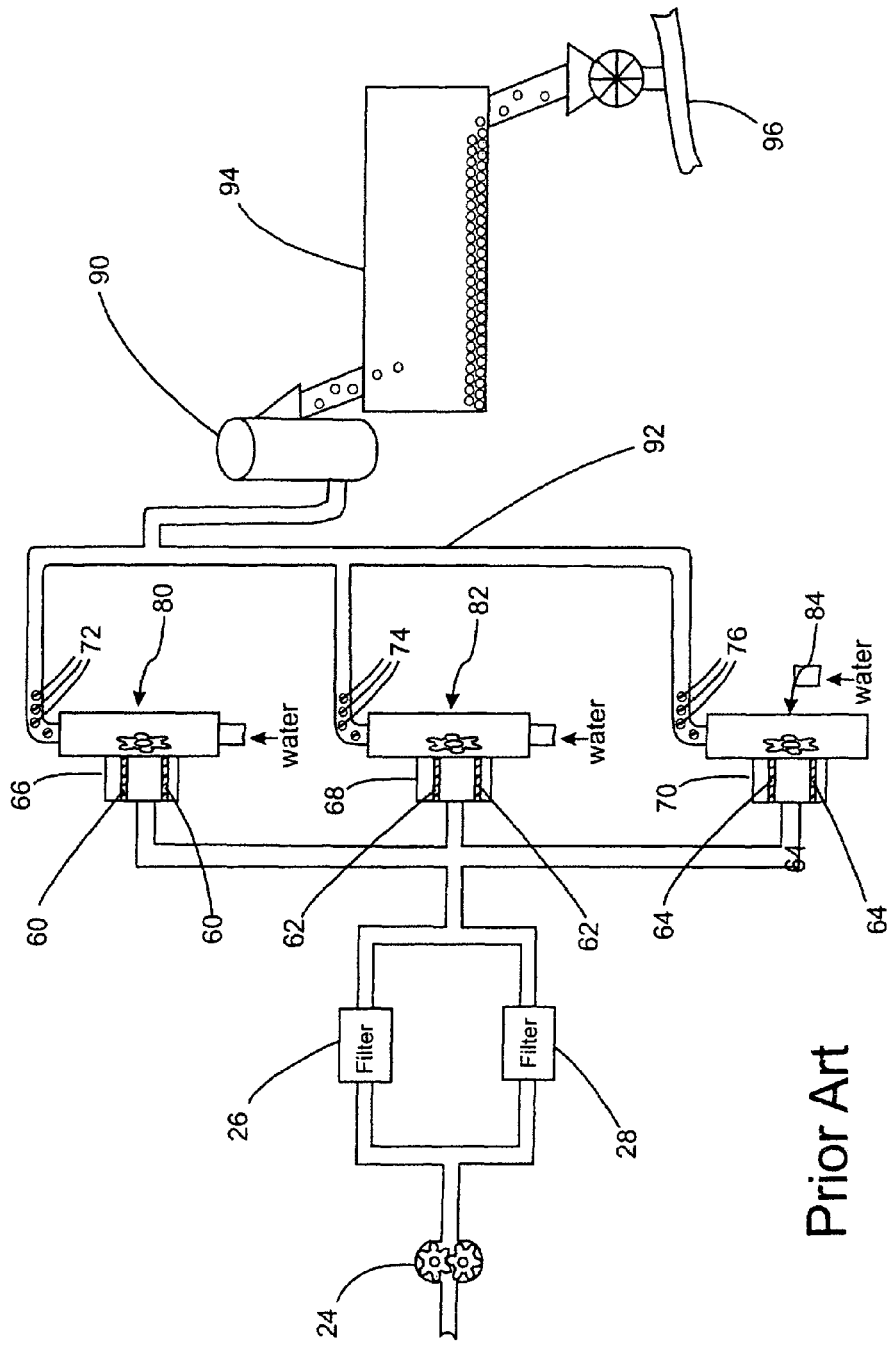
FIG. 1C is a schematic illustration of a polyester manufacturing line showing processing after polycondensation reactors using die face cutters to form the polyester pellets.

In a particularly useful variation of the present embodiment, polymeric pellets 100 are cut by die face pellet cutters as set forth above in connection with the description of FIG. 1C. In this variation, pellets 100 are transferred from the die face pellet cutters to dryer 90 via pellet conveying system 92. Examples of useful dryers include centripetal dryers that remove pellets 100 from the water. It should be appreciated that in this context dryer 90 is any device that may be used to separate the pellets from the water. Upon exiting dryer 90, additional water may be boiled off due to the heat content of pellets 100, which is still relatively high upon emerging from dryer 90. In this variation using die face pellet cutters, pellets 100 are transferred sufficiently quickly from the cutters to the dryer so that pellets 100 retain a substantial amount of heat. Typically, the polymeric pellets exiting such a dryer have temperatures exceeding 135° C.

It should be appreciated that each of pellets 100 typically has a relatively non-uniform temperature distribution with the interior of the pellets being hotter than the exterior of the pellets. This is due to the cooling effect of the water used in the die face cutters and pellet conveying system 92 and the low thermal conductivity of the polymer. Moreover, each pellet is likely to have a slightly varying temperature profile. Therefore, it is appropriate to describe the plurality of pellets as having an average pellet temperature.

It should also be appreciated that the water used to transport pellets 100 from the die face cutters to dryer 90 may be substituted by other conveying fluids with superior or more desirable heat transfer properties. The average temperature of pellets 100 may also be controlled by the temperature of the water (or other conveying fluid) used to convey pellets 100 from the die face cutters to dryer 90. For example, the conveying fluid may be heated to allow for higher initial average pellet temperatures (introduced to pneumatic conveying system 102) or cooled to allow for lower initial average pellet temperatures. In a typical polyester forming process, the transit time from the die face cutters to dryer 90 is on the order of a few seconds with a pellet containing slurry traveling at a velocity from 10 to 30 feet/s while in pellet conveying system 92.

In one variation of the present embodiment, polymer pellets 100 enter pneumatic conveying system 102 with an average temperature that is above an optimal temperature for crystallization. In this variation, the polymer pellets 100 are cooled by the conveying gas, which in this variation will have a temperature lower than that of the average temperature of pellets 100. The method of the present variation is particularly useful for the crystallization of polyethylene terephthalate pellets, which usually start to crystallize at a temperature of 135° C. and melt at a temperature of 200° C. When pellets 100 have regions with sufficient heat content for crystallization to occur, the average pellet temperature increases as pellets 100 are conveyed. This temperature increase is the result of the liberation of the heat of crystallization from pellets 100 as they crystallize.

In one refinement of the present variation, the difference between the initial average pellet temperature (as introduced into pneumatic conveying system 102) and the crystallization temperature is less than the temperature rise induced by the crystallization of the pellets 100 in the absence of external cooling. Therefore, in this refinement, cooled conveying gas is used to pneumatically convey the pellets and to inhibit melting or sticking of the pellets while still allowing crystallization to occur.

In another variation of the present invention, the pellets will contain sufficient internal heat for crystallization to occur. In other variations of the present invention, the pellets do not contain sufficient heat for crystallization. In this latter variation, the average pellet temperature is adjusted by contact with a conveying gas at elevated temperature.

In still another variation of the present embodiment, polymer pellets 100 enter pneumatic conveying system 102 with an average temperature too low for crystallization to proceed to a desired degree. In this situation, the temperature of the conveying gas is such that polymeric pellets 100 are heated by contact with the conveying gas (i.e., the temperature of the conveying gas is higher than the average temperature of pellets 100).

In yet another variation of the present invention, the conveying gas 119 has a sufficient temperature to strip acetaldehyde from pellets 100. For acetaldehyde stripping to be most efficient, the temperature the conveying gas 119 must be below the equilibrium concentration of acetaldehyde in the pellets 100 at the temperatures and pressures present in pneumatic conveying system 102. The acetaldehyde in the conveying gas 119 should be below the vapor pressure of the acetaldehyde in the pellets 100 to allow the acetaldehyde to diffuse into the conveying gas. In a variation, the temperature of the conveying gas is sufficient to reduce the residual acetaldehyde from the polymeric pellets by at least 4 ppm. In another variation, the temperature of the conveying gas is sufficient to reduce the residual acetaldehyde from the polymeric pellets by at least 2 ppm. In yet another variation, the temperature of the conveying gas is sufficient to reduce the residual acetaldehyde from the polymeric pellets by at least 1 ppm. Moreover, additional acetaldehyde stripping is optionally accomplished in collection device or vessel 126 (FIG. 2) by flowing additional gas through that device via conduit 134. This additional gas is vented through conduit 136 with the stripped acetaldehyde being destroyed in thermal destruction device 132. In a variation, the pellets exiting outlet 118 of the conveyor system are continuously fed to a vessel in which the residual acetaldehyde level of the pellets is reduced. In a further refinement of this variation, the vessel is oriented having an inlet and outlet at locations such that the flow regime of the polyester polymeric pellets within said vessel is plug flow. Typically, the reduction in acetaldehyde level within said vessel is at least 4 ppm. In other refinements, the reduction in acetaldehyde level within said vessel is at least 2 ppm. Acetaldehyde stripping is further enhanced by using relatively smaller pellets.

Figure 4:
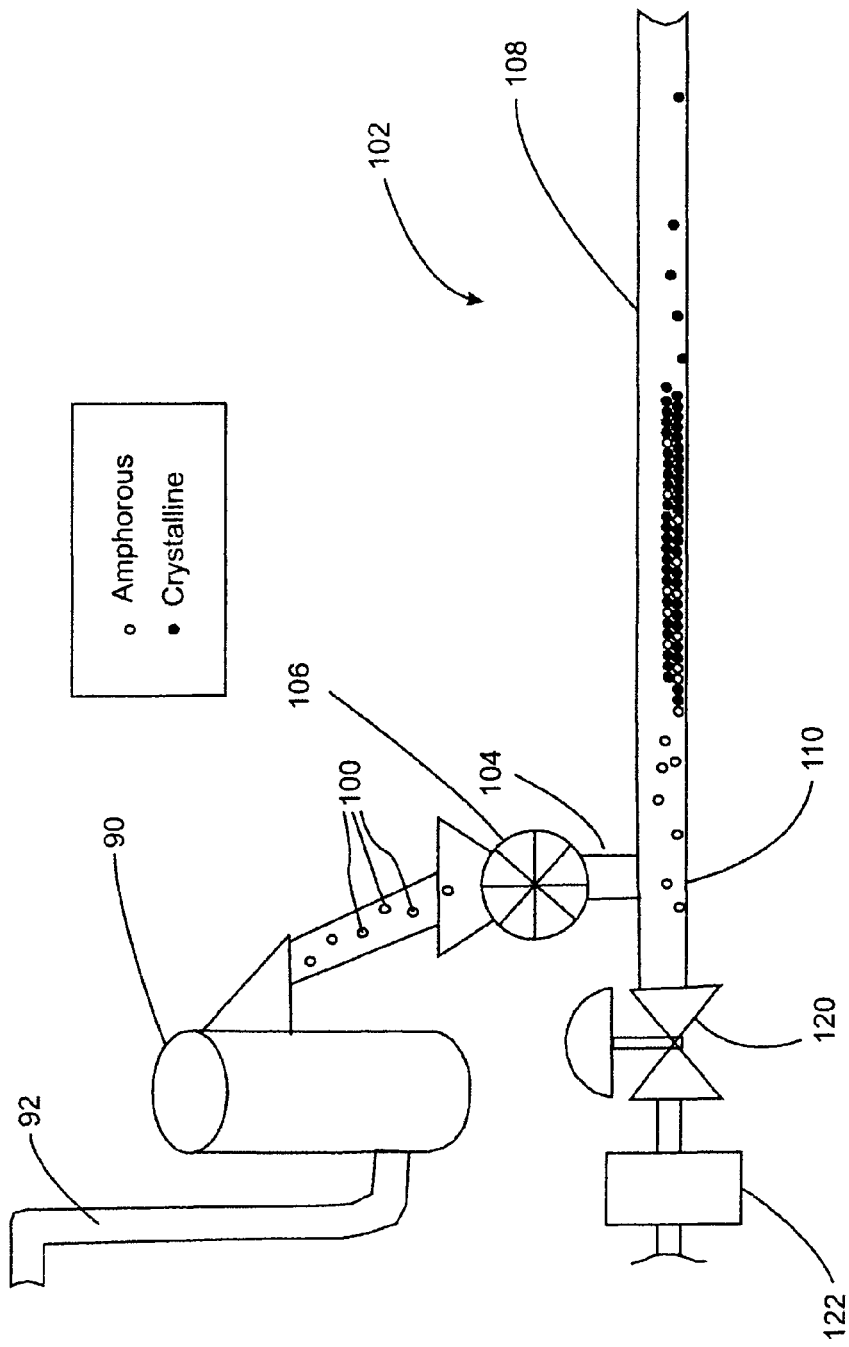
FIG. 4 is a schematic illustration of an embodiment of a pneumatic conveying system with an extended horizontal conduit section.
Figure 5:
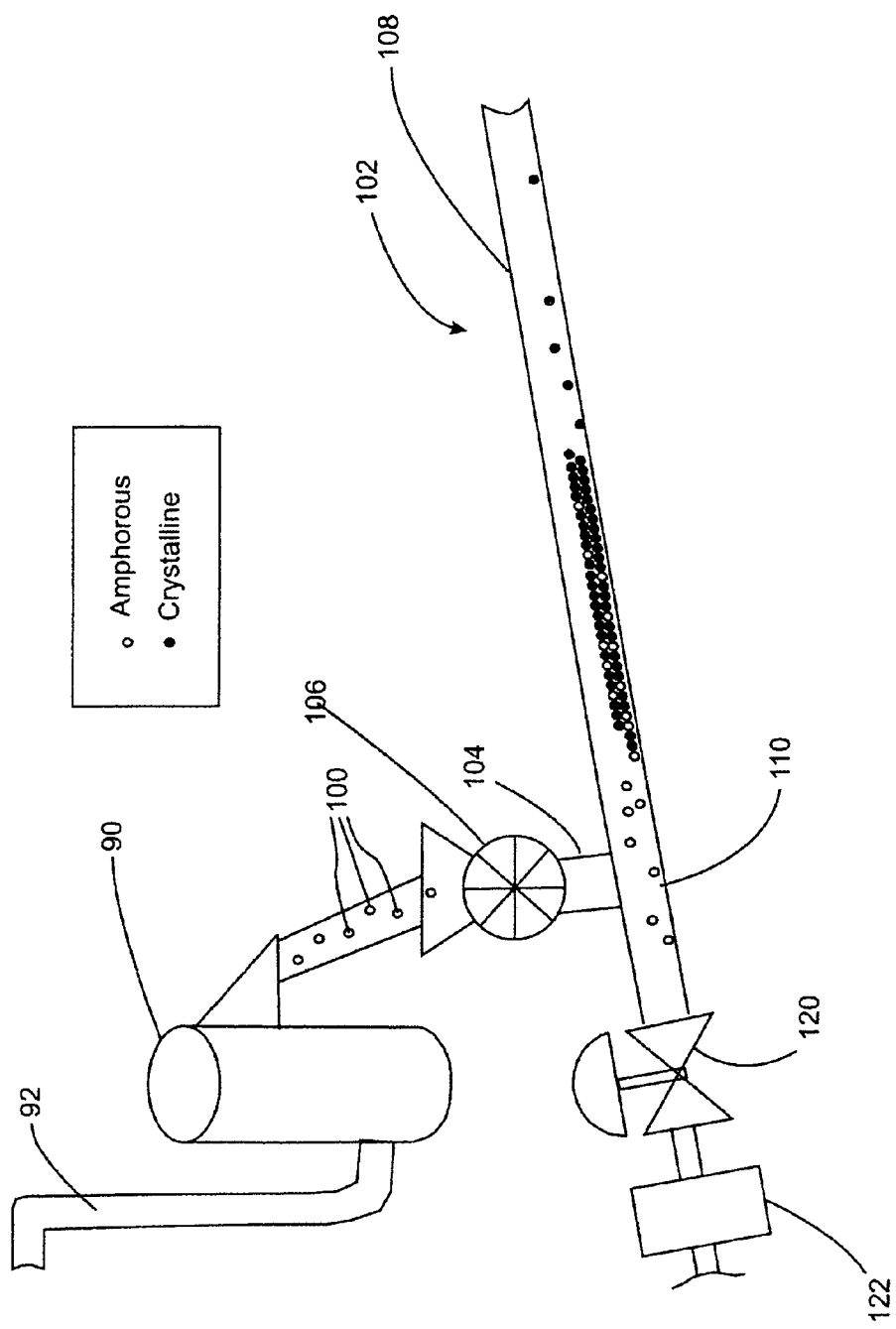
FIG. 5 is a schematic illustration of an embodiment of a pneumatic conveying system with an initial extended inclined conduit section.

With reference to FIGS. 4 and 5, variations of the present embodiment are provided. In FIG. 4, a variation in which conveying conduit 108 is substantially horizontal from the inlet 104 is illustrated. In this variation, the plurality of polymeric pellets 100 are introduced into conveying conduit 108 at conduit section 110 that is substantially horizontal. Conveying conduit 108 may remain substantially horizontal until the next station or process device (e.g., collection device 126). Conduit section 110 remains substantially horizontal for some distance. In one refinement, conduit section 110 is horizontal for at least 10 feet. In another refinement, conduit section 110 is horizontal for a distance of at least 50 feet. In yet another refinement, conduit section 110 is horizontal for a distance of at least 100 feet.

It should also be appreciated that the total length of conveying conduit 108 is from 10 feet to 1,000 feet. In another refinement, the total length of conveying conduit 108 is from 50 feet to 500 feet. In yet another refinement, the total length of conveying conduit 108 is from 100 feet to 300 feet.

In FIG. 5, a variation in which conveying conduit 108 is initially angled from a region adjacent to pellet inlet 104 is illustrated. Conveying conduit 108 may remain substantially inclined until the next station or process device (e.g., collection device 126).

Any type of gas, inert or reactive, that does not react substantially with the pellets 100 nor adversely affects the properties of the pellets may be used as the conveying gas 119. Suitable gases include, but are not limited to, air, nitrogen, argon, carbon dioxide, combinations thereof, and the like. In a variation of the present embodiment, flow control device 120 is used to control the flow rate of the conveying gas 119. In another variation, the flow rate of the conveying gas 119 may be controlled by a positive pressure condenser such as a rotary lobe compressor, which can control the speed of the conveying gas to control the flow.

In another embodiment of the present invention, a pneumatic conveying system for crystallizing a polymeric pellets implementing the methods of the invention is provided. With reference to FIG. 2, pneumatic conveying system 102 further includes an inlet 104 for introducing the plurality of polymeric pellets 100 into the conduit 108 and an outlet 118 for removing the plurality of polymer pellets. In at least the illustrated embodiment, pellets 100 are introduced into pellet inlet 104 by differential pressure separation device 106. Examples of devices that may be used for differential pressure separation device 106 include, but are not limited to, rotary airlocks and blow pots. Pneumatic conveying system 102 includes conveying conduit 108 for pneumatically transporting a plurality of polymeric pellets 100 with a conveying gas 119.

In a refinement of the present embodiment, the total length of conveying conduit 108 is from 10 feet to 1000 feet. In another refinement, the total length of conveying conduit 108 is from 50 feet to 500 feet. In yet another refinement, the total length of conveying conduit 108 is from 100 feet to 300 feet. Conveying conduit 108 includes conduit section 110 that is substantially horizontal. The horizontal configuration of conduit section 110 allows the pellets to become situated for conveyance. Typically, conduit section 110 is from 5 to 20 pipe diameters in length. Pneumatic conveying conduit 110 optionally includes upwardly inclined section 112, the details of which are set forth above.

Conveying conduit 108 optionally includes additional conduit sections such as conduit section 116 that is also substantially horizontal. In accordance with the method of the present embodiment, the plurality of polymeric pellets is pneumatically transferred from the inlet 104 to outlet 118 by a conveying gas. The flow of conveying gas 119 may be adjusted by flow control device 120. Examples of suitable flow control device 120 include, but are not limited to, metering compressors, flow meters, mass flow controller, valves, and the like. The conveying gas 119 has a temperature sufficient to maintain the plurality of pellets within a temperature range such that crystallization of the plurality of polymeric pellets is substantially initiated or accomplished prior to removal of the pellets from pneumatic conveying system 102. In at least one embodiment, the temperature range is below the melting temperature of polymeric pellets 100.

The conveying gas 119, which is effecting the transfer of the pellets, may optionally be heated or cooled by temperature adjustment device 122. FIG. 2 illustrates the pellets 100 being transferred to collection device 126. Finally, the conveying gas 119 is optionally recovered via heat exchange device 130 and volatile organic compounds may be destroyed in thermal destruction device 132.

FIG. 4 provides a schematic illustration in which conduit section 110 extends horizontally for some distance. In a further refinement, conveying conduit 108 may remain substantially horizontal until the next station or process device (e.g., collection device 126). In one refinement, conduit section 110 is horizontal for at least 10 feet. In another refinement, conduit section 110 is horizontal for a distance of at least 50 feet. In yet another refinement, conduit section 110 is horizontal for a distance of at least 100 feet. It should also be appreciated, the total length of conveying conduit 108 is from 10 feet to 1000 feet. In another refinement, the total length of conveying conduit 108 is from 50 feet to 500 feet. In yet another refinement, the total length of conveying conduit 108 is from 100 feet to 300 feet.

In FIG. 5, a variation in which conveying conduit 108 is initially angled from a region adjacent to pellet inlet 104 is illustrated. Conveying conduit 108 may remain substantially inclined until the next station or process device (e.g., collection device 126).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of crystallizing a plurality of polymeric pellets, the method comprising:
   a) introducing the plurality of polymeric pellets into a pneumatic conveying system at an inlet, the plurality of polymeric pellets comprising a crystallizable polymer having a crystallization temperature and a melting temperature; and
   b) pneumatically transferring the plurality of polymeric pellets from the inlet to an outlet with a conveying gas, the conveying gas having a temperature sufficient to maintain the plurality of polymeric pellets within a temperature range such that the plurality of polymeric pellets obtain a degree of crystallinity greater than about 30% prior to removal of the plurality of polymeric pellets from the outlet of the pneumatic conveying system.

2. The method of claim 1 wherein a portion of the plurality of polymeric pellets have a spherical shape or a cylindrical shape.

3. The method of claim 1 wherein a portion of the plurality of polymeric pellets have a rectangular cross section.

4. The method of claim 1 wherein the plurality of polymeric pellets comprise a component selected from the group consisting of polyester, polyolefins, polystyrenes, nylons, and polyketones.

5. The method of claim 1 wherein the plurality of polymeric pellets comprise a polyester.

6. The method of claim 5 wherein the polyester is a polyethylene terephthalate polymer or copolymer.

7. The method of claim 1 wherein the plurality of polymeric pellets have a degree of crystallinity of at least 40% after removal from the outlet of the pneumatic conveying system.

8. The method of claim 1 wherein the degree of crystallinity of the plurality of polymeric pellets introduced into the pneumatic conveying system is increased by at least 10%.

9. The method of claim 1 wherein the degree of crystallinity of the plurality of polymeric pellets introduced into the pneumatic conveying system is increased by at least 20%.

10. The method of claim 1 wherein the degree of crystallinity of the plurality of polymeric pellets introduced into the pneumatic conveying system is less than 30%.

11. The method of claim 1 wherein the degree of crystallinity of the plurality of polymeric pellets introduced into the pneumatic conveying system is less than 20%.

12. The method of claim 1 wherein the crystallizable polymer comprises PET and the temperature range is from about 135° C. to about 200° C.

13. The method of claim 1 wherein the crystallizable polymer comprises a polyalkylene terephthalate or polyalkylene naphthalate polymer or copolymer and the temperature range is from about 135° C. to about 190° C.

14. The method of claim 1 wherein the residence time of the plurality of polymeric pellets within the pneumatic conveying system is from 30 seconds to 20 minutes.

15. The method of claim 1 wherein the pneumatic conveying system is a dense phase conveying system.

16. The method of claim 1 wherein the pneumatic conveying system is a dilute phase conveying system.

17. The method of claim 1 wherein the plurality of polymeric pellets comprise regions having a temperature greater than or equal to the crystallization temperature of the polymer.

18. The method of claim 1 wherein the conveying gas is selected from the group consisting of air, nitrogen, carbon dioxide, and argon.

19. The method of claim 1 wherein the conveying gas is introduced into the pneumatic conveying system at a temperature ranging from 0 to 220° C.

20. The method of claim 1 wherein the conveying gas temperature as introduced into the pneumatic conveying system is less than the temperature of the plurality of polymeric pellets introduced into the inlet.

21. The method of claim 1 wherein the plurality of polymeric pellets are introduced into the inlet of the pneumatic conveying system by a differential pressure separation device.

22. The method of claim 1 further comprising continuously separating a liquid from the plurality of polymeric pellets, and continuously introducing the plurality of polymeric pellets into the inlet of the pneumatic conveying system.

23. The method of claim 22 wherein the plurality of polymeric pellets, when introduced into the inlet of the pneumatic conveying system, have a moisture content less than 1 wt %.

24. The method of claim 22 wherein the plurality of polymeric pellets, when introduced into the inlet of the pneumatic conveying system, have a moisture content less than 0.2 wt %.

25. The method of claim 1 further comprising, in a continuous process, melt phase polymerizing virgin polyester molten polymer, solidifying the molten polymer to form the plurality of polymeric pellets in contact with water, and separating at least a portion of the water from the plurality of polymeric pellets before introducing the plurality of polymeric pellets into the pneumatic conveying system.

26. The method of claim 25 wherein the plurality of polymeric pellets formed from the solidification process have an It.V. of at least 0.70 dL/g and up to 1.2 dL/g.

27. The method of claim 26 wherein the It.V. is at least 0.72 dL/g.

28. The method of claim 26 wherein the It.V. is at least 0.76 dL/g.

29. The method of claim 25 wherein the plurality of polymeric pellets exiting the outlet of the pneumatic conveying system are continuously fed to a vessel in which the residual acetaldehyde level of the plurality of polymeric pellets is reduced.

30. The method of claim 29 wherein the reduction of the residual acetaldehyde level within the vessel is at least 4 ppm.

31. The method of claim 29 wherein the residual acetaldehyde level of the plurality of polymeric pellets upon exiting the vessel is less than 2 ppm.

32. The method of claim 1 wherein the pneumatic conveying system comprises an upwardly inclined section having an angle such that the plurality of polymeric pellets travel upwardly when transported through the upwardly inclined section.

33. The method of claim 32 wherein the angle is sufficient to cause a portion of the plurality of polymeric pellets entering the upwardly inclined section to fall downwardly thereby mixing the plurality of polymeric pellets.

34. The method of claim 33 wherein the angle is from about 25° to 65°.

35. The method of claim 1 wherein the plurality of polymeric pellets are introduced into the pneumatic conveying system in an amount of 5,000 lb/hr to 200,000 lb/hr.

36. The method of claim 1 wherein the temperature of the conveying gas is sufficient to reduce the residual acetaldehyde from the plurality of polymeric pellets by at least 4 ppm.

37. The method of claim 36 wherein the concentration of acetaldehyde in the conveying gas is less than the equilibrium concentration of the residual acetaldehyde in the plurality of polymeric pellets at the temperatures and pressures present in the pneumatic conveying system.

38. The method of claim 1 wherein the temperature of the conveying gas is sufficient to reduce the residual acetaldehyde from the plurality of polymeric pellets by at least 2 ppm.

39. The method of claim 1 wherein the temperature of the conveying gas is sufficient to reduce the residual acetaldehyde from the plurality of polymeric pellets by at least 1 ppm.

40. The method of claim 1 further comprising contacting the plurality of polymeric pellets in the pneumatic conveying system with a fluid at a temperature sufficient to cool the plurality of polymeric pellets.

41. The method of claim 40 wherein the fluid is liquid that boils upon contact with the plurality of polymeric pellets.

42. The method of claim 41 wherein the liquid comprises water.

43. The method of claim 1 wherein a portion of the plurality of polymeric pellets are three-dimensional objects characterized by a largest size dimension, the largest size dimension being less than about 0.25 inches.

44. The method of claim 1 wherein the length of the pneumatic conveying system is at least 50 feet.

45. The method of claim 1 further comprising packaging the plurality of polymeric pellets into a shipping container, wherein the plurality of polymeric pellets are not polymerized in the solid state.

46. The method of claim 1, wherein the plurality of polymeric pellets are obtained by cutting molten polyester polymer.

47. The method of claim 1, wherein the plurality of polymeric pellets are obtained by cutting molten polyester polymer with a die face cutter.

48. A method of crystallizing a plurality of PET pellets, the method comprising:
   a) introducing the plurality of PET pellets into a pneumatic conveying system at an inlet, the plurality of PET pellets being crystallizable and having a crystallization temperature and a melting temperature; and
   b) pneumatically transferring the plurality of PET pellets from the inlet to an outlet with a conveying gas, the conveying gas having a temperature sufficient to maintain the plurality of PET pellets within a temperature range such that the plurality of PET pellets obtain a degree of crystallinity greater than about 30% prior to removal of the plurality of PET pellets from the outlet of the pneumatic conveying system.

* * * * *